April 6, 1954             R. E. SCHURTZ             2,674,491
THERAPEUTIC BATH APPARATUS Filed Sept. 25, 1950                                11 Sheets-Sheet 1

INVENTOR,
Ralph E. Schurtz.
BY Roy E. Hamilton,
Attorney.

April 6, 1954  R. E. SCHURTZ  2,674,491
THERAPEUTIC BATH APPARATUS
Filed Sept. 25, 1950  11 Sheets-Sheet 2
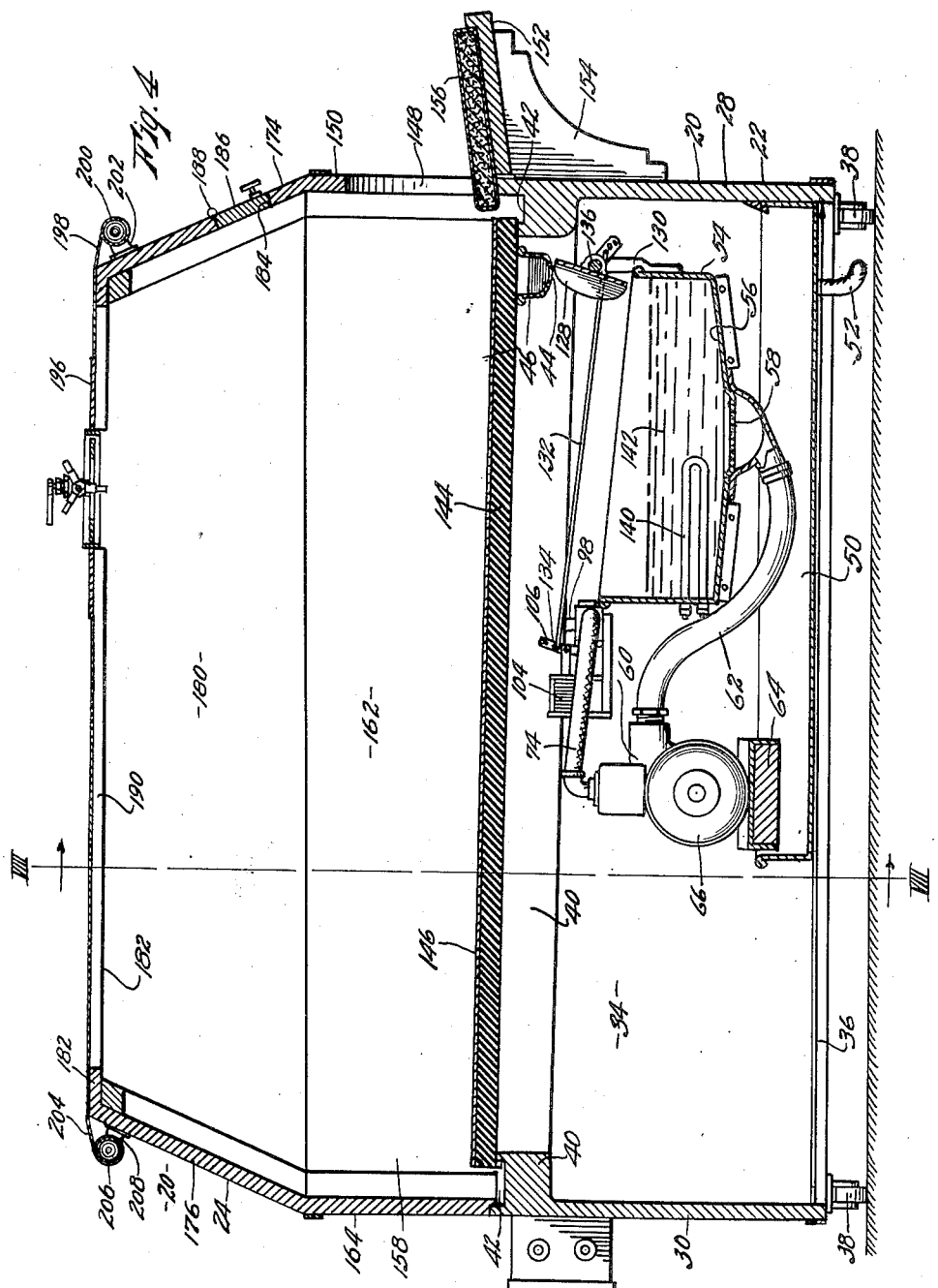
INVENTOR,
Ralph E. Schurtz.
BY
Roy E. Hamilton,
Attorney.

April 6, 1954 R. E. SCHURTZ 2,674,491
THERAPEUTIC BATH APPARATUS
Filed Sept. 25, 1950 11 Sheets-Sheet 3
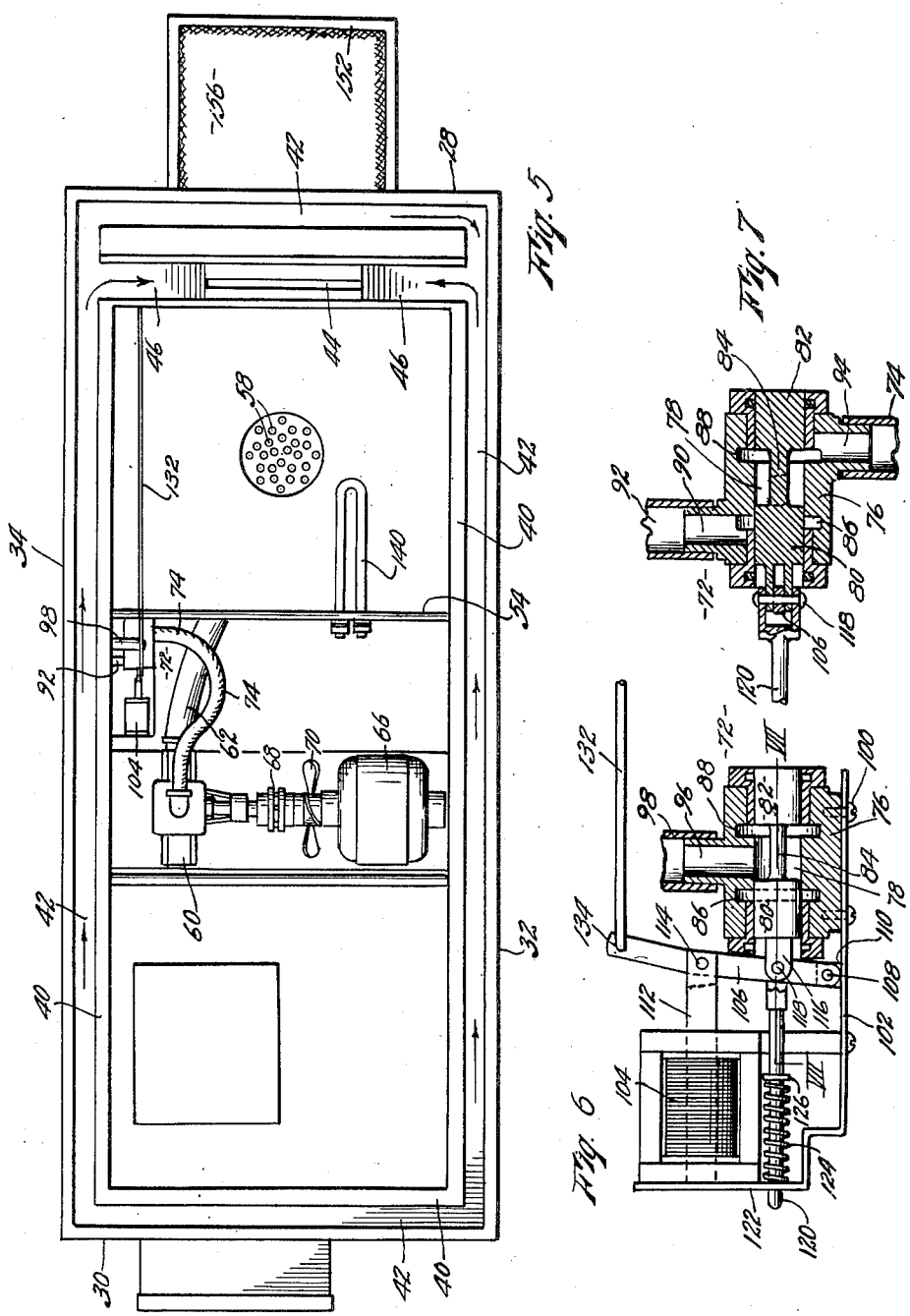
INVENTOR,
Ralph E. Schurtz.
BY
Roy E. Hamilton,
Attorney April 6, 1954 R. E. SCHURTZ 2,674,491
THERAPEUTIC BATH APPARATUS
Filed Sept. 25, 1950 11 Sheets-Sheet 4
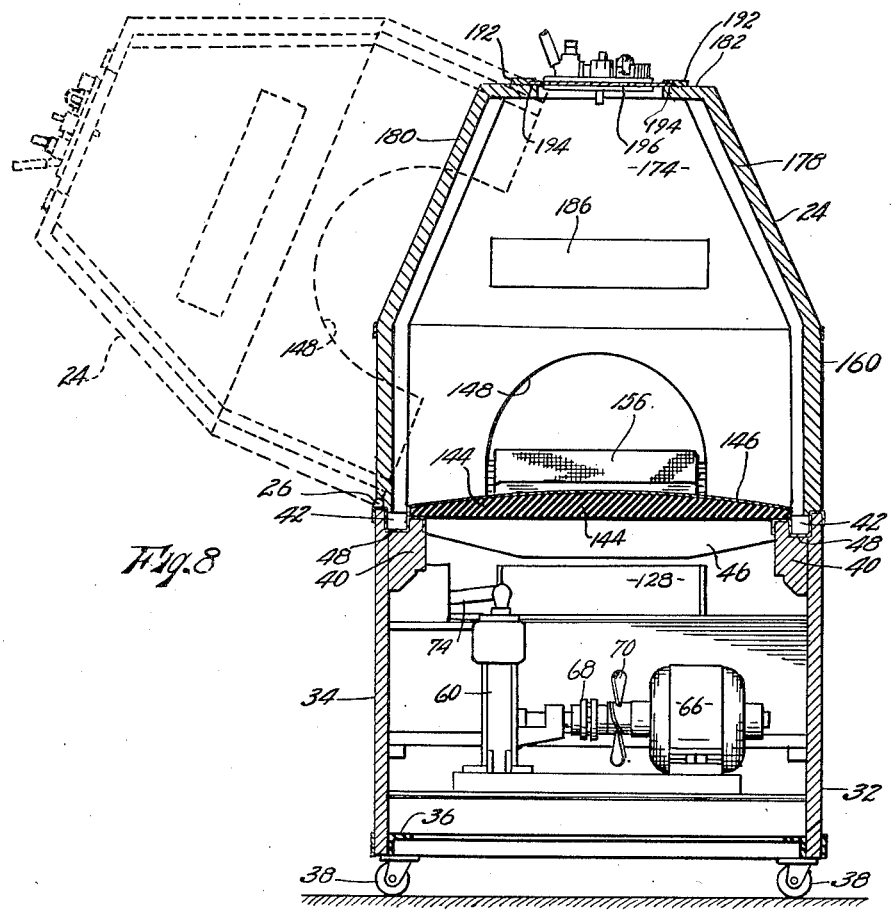
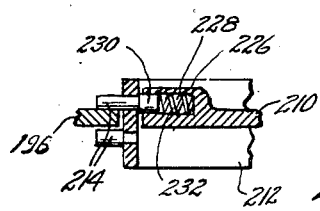 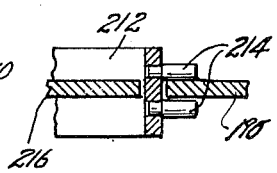 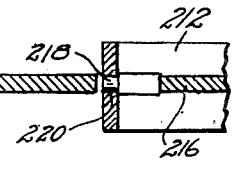
INVENTOR,
Ralph E. Schurtz.
BY
Roy F. Hamilton,
Attorney.

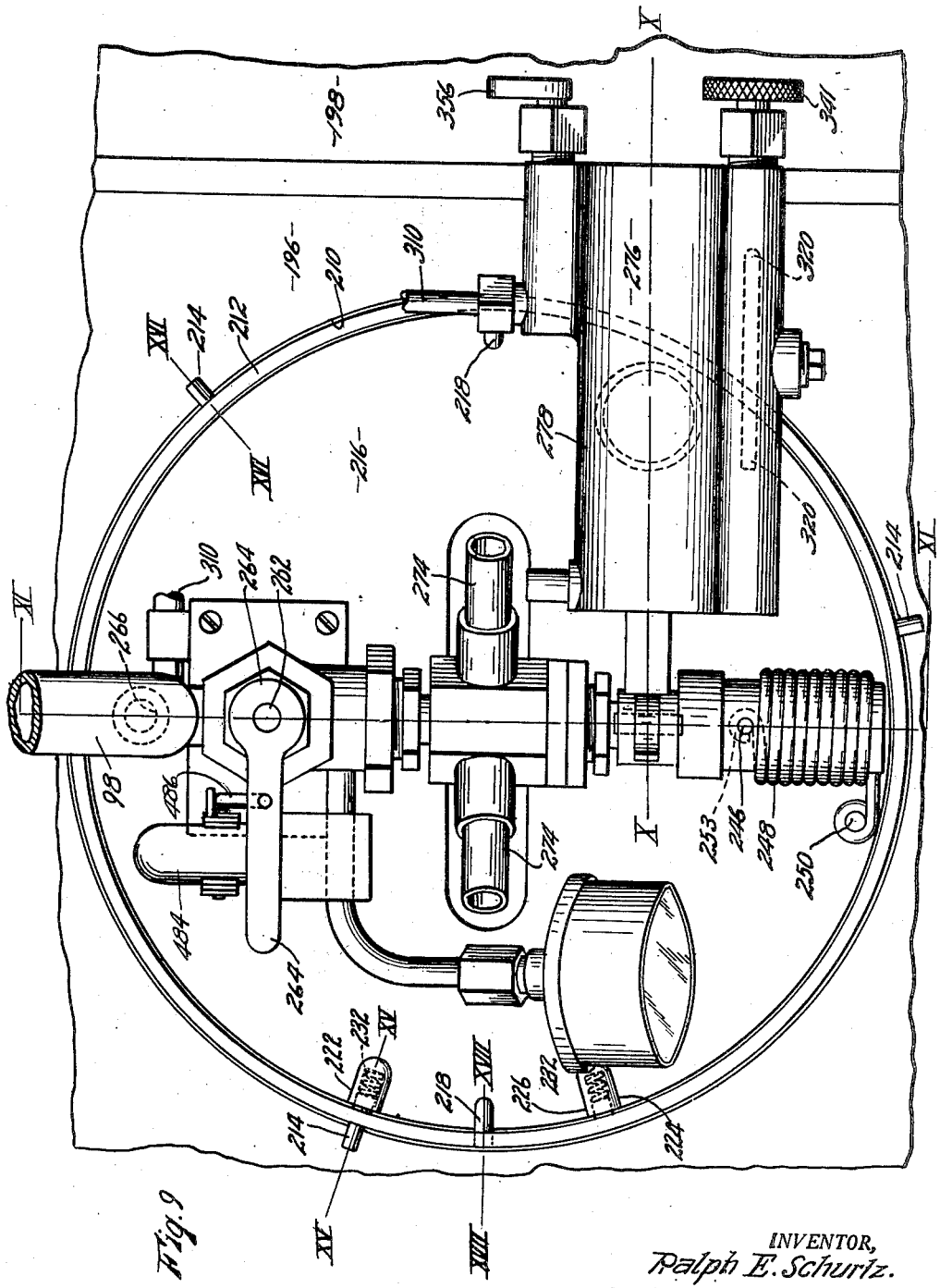

April 6, 1954

R. E. SCHURTZ 2,674,491

THERAPEUTIC BATH APPARATUS

Filed Sept. 25, 1950

INVENTOR,
Ralph E. Schurtz,
BY
Roy E. Hamilton,
Attorney.

April 6, 1954
R. E. SCHURTZ
2,674,491
THERAPEUTIC BATH APPARATUS
Filed Sept. 25, 1950
11 Sheets-Sheet 7
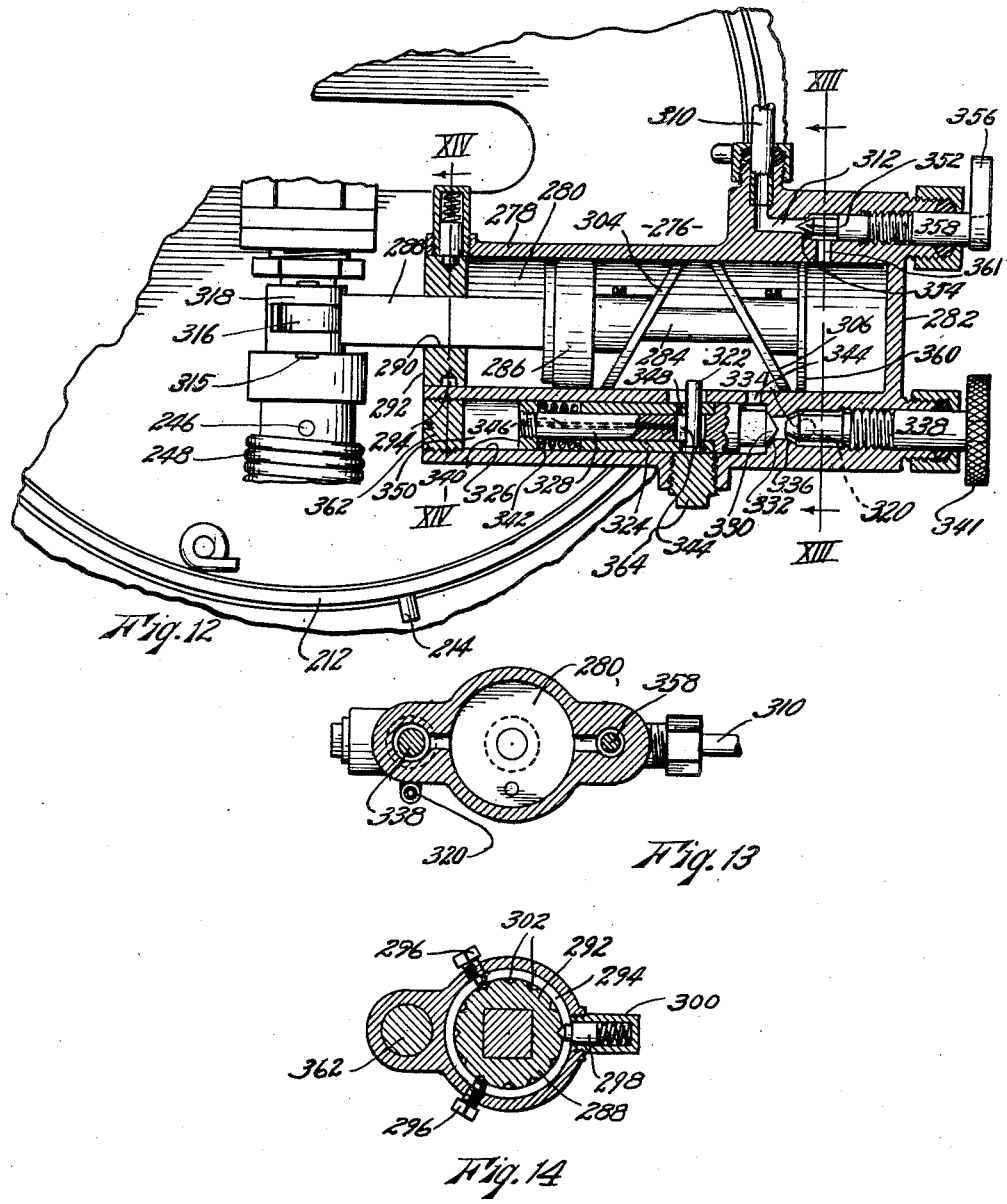
INVENTOR,
Ralph E. Schurtz.
BY
Roy E. Hamilton,
Attorney.

April 6, 1954  R. E. SCHURTZ  2,674,491
THERAPEUTIC BATH APPARATUS
Filed Sept. 25, 1950  11 Sheets-Sheet 8

INVENTOR,
Ralph E. Schurtz.
BY Roy E. Hamilton,
Attorney.

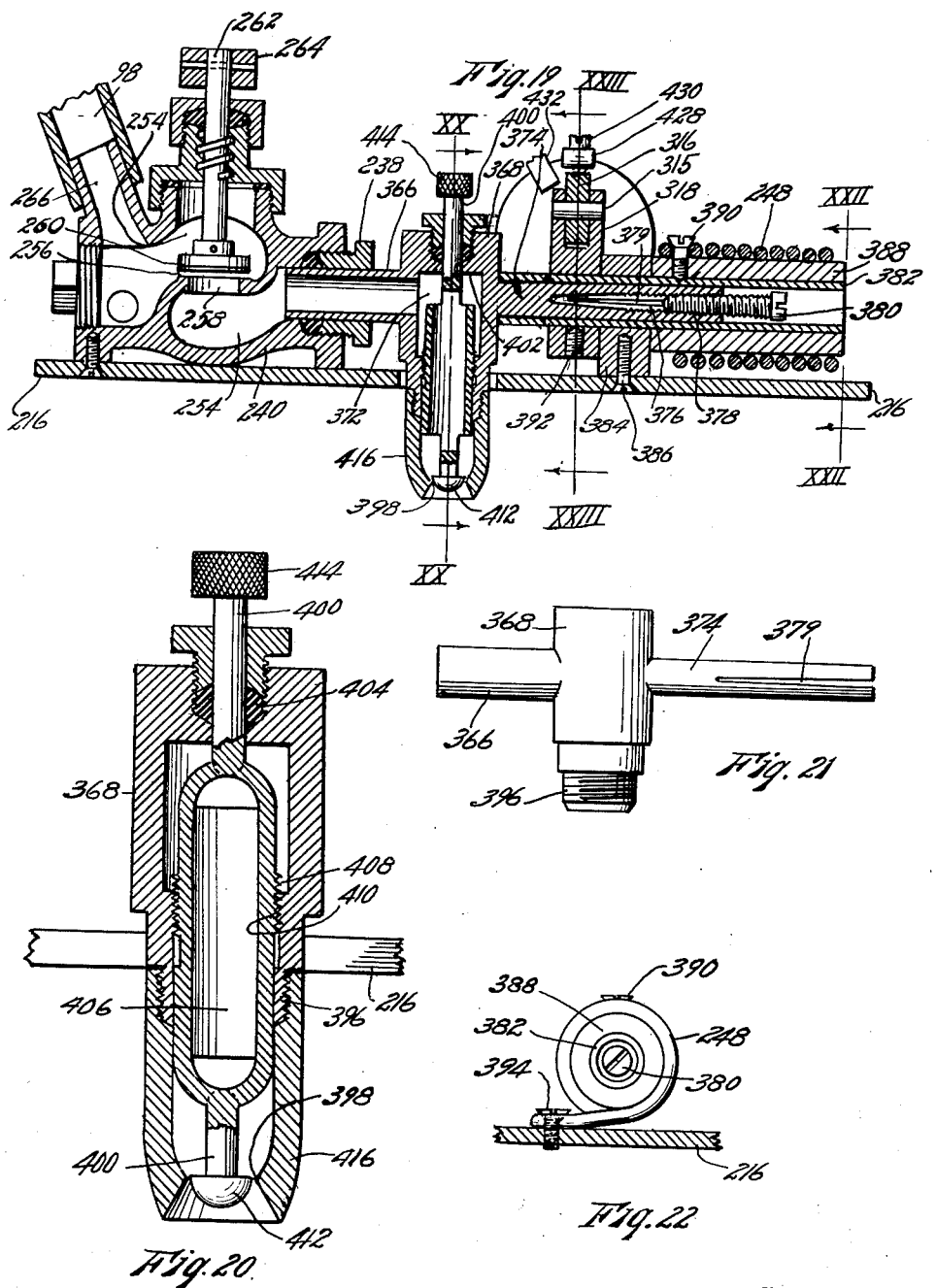

April 6, 1954  R. E. SCHURTZ  2,674,491
THERAPEUTIC BATH APPARATUS
Filed Sept. 25, 1950  11 Sheets-Sheet 10
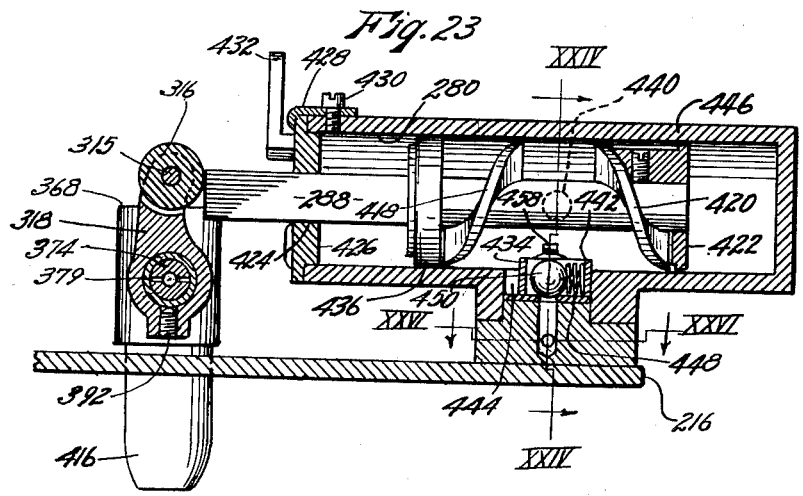
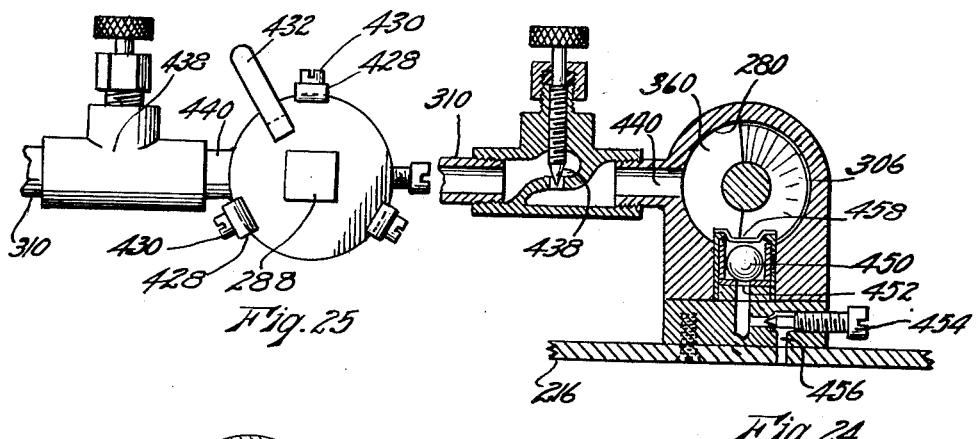
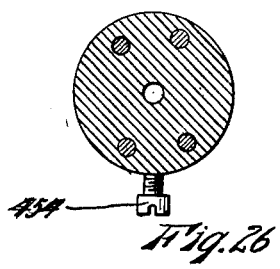
INVENTOR,
Ralph E. Schurtz.
BY Roy E. Hamilton,
Attorney.

Patented Apr. 6, 1954

2,674,491

UNITED STATES PATENT OFFICE 2,674,491

THERAPEUTIC BATH APPARATUS

Ralph E. Schurtz, Kansas City, Mo.

Application September 25, 1950, Serial No. 186,527

7 Claims. (Cl. 299—66)

This invention relates to improvements in therapeutic bath apparatus, and has particular reference to an apparatus of this character wherein water sprays of different temperatures are applied at predetermined periods of time to the body of the patient either in the presence or absence of suitable electrical impulse to stimulate the muscles of the patient.

By actual tests it has been found that spray baths such as contemplated by this invention, together with properly controlled electrical discharges have been found very beneficial in the treatment of ailments of the human body. The intermittent applications of water of different temperatures, the application of water of different types of spray for different relative periods of time, and at different pressures, are provided by this device for different ailments and for different patients.

The spray baths provided by this device for different patients are beneficial, principally because of the reaction produced by the massage effect of the water when applied to the body of the patient in spray forms of varying characteristics.

Another beneficial reaction is obtained by the resultant reaction of the muscles due to the electric application during the spraying operation.

Other objects are simplicity and sturdiness of construction, ease and accuracy of operation, and adaptability for use in numerous variations and combinations of water temperatures, pressures and electrical discharges.

With these objects in view, as well as other objects which will appear during the course of the specification, reference will be had to the drawings wherein:

Fig. 4 is an enlarged longitudinal vertical sectional view with some parts left in elevation.

Fig. 5 is a plan view of the cabinet with the cover removed.

Fig. 6 is an enlarged elevational view of the solenoid operated control valve which controls the flow of hot and cold water to the spray nozzle with the valve in section.

Fig. 7 is a horizontal sectional view of the valve taken on line VII—VII of Fig. 6.

Fig. 8 is a cross sectional view of the bath apparatus taken on line VIII—VIII of Fig. 4.

Fig. 9 is an enlarged plan view of the nozzle control mechanism.

Fig. 12 is a horizontal sectional view taken on line XII—XII of Fig. 10.

Fig. 13 is a cross sectional view taken on line XIII—XIII of Fig. 12.

Fig. 14 is a cross sectional view taken on line XIV—XIV of Fig. 12.

Fig. 15 is a sectional view taken on line XV—XV of Fig. 9.

Fig. 16 is a sectional view taken on line XVI—XVI of Fig. 9.

Fig. 17 is a sectional view taken on line XVII—XVII of Fig. 9.

Fig. 19 is a sectional view of a modified form of the structure shown in Fig. 11.

Fig. 20 is an enlarged sectional view taken on line XX—XX of Fig. 19.

Fig. 21 is an elevational view of the body of the spray nozzle.

Fig. 22 is a section taken on line XXII—XXII of Fig. 19.

Fig. 23 is a sectional view taken on line XXIII—XXIII of Fig. 19.

Fig. 24 is a sectional view taken on line XXIV—XXIV of Fig. 23.

Fig. 25 is a front elevational view of the motor.

Fig. 26 is an elevational view taken on line XXVI—XXVI of Fig. 23.

Figure 1:
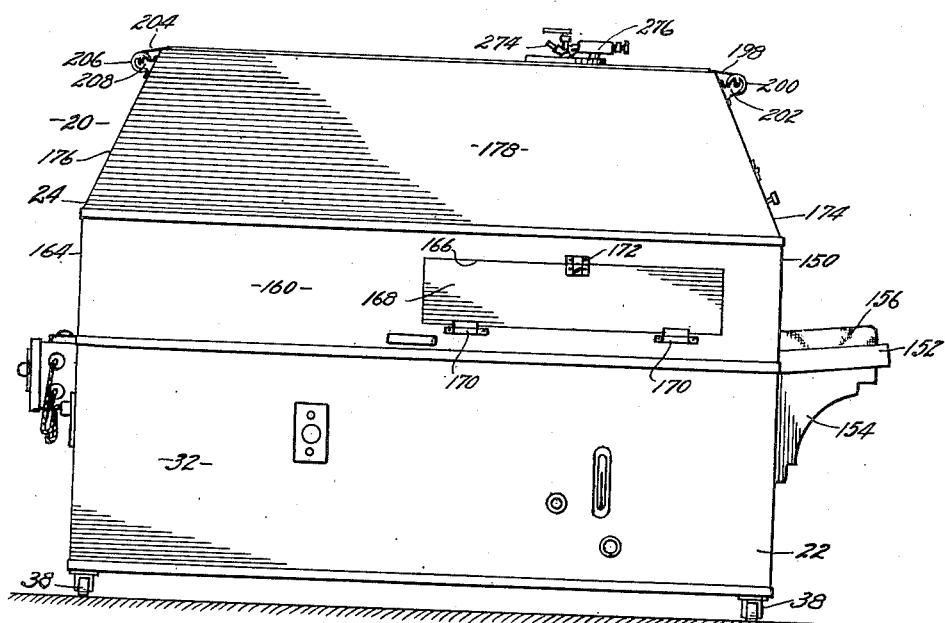
Fig. 1 is a side elevation of the therapeutic bath apparatus embodying this invention.
Figures 2, 3:
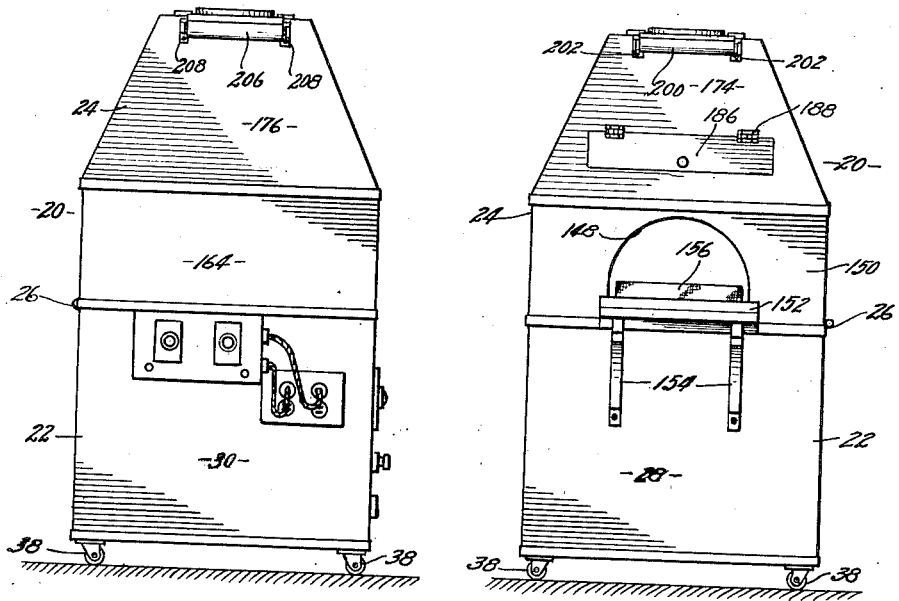
Fig. 2 is an elevational view of the foot end of the bath apparatus.
Fig. 3 is an elevational view of the head end of the apparatus.
Figure 10:
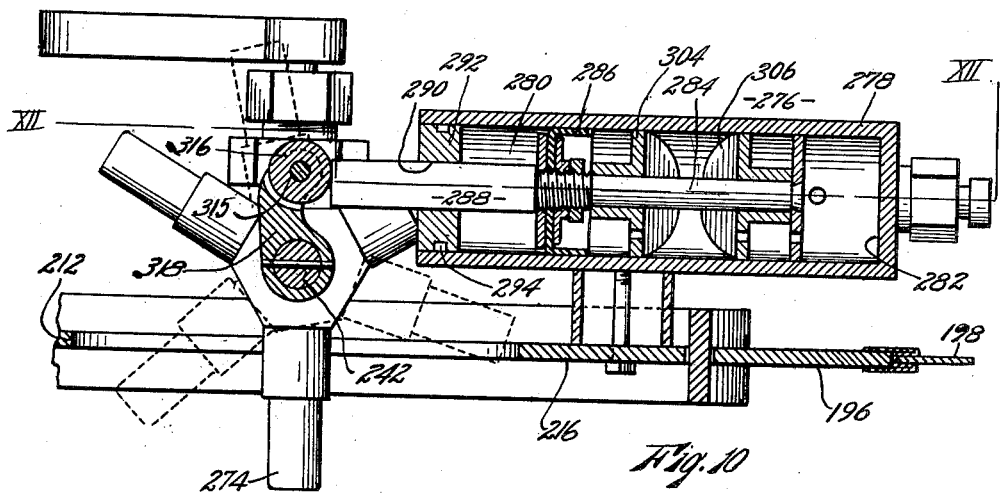
Fig. 10 is a vertical sectional view taken on line X—X of Fig. 9.

Throughout the several views like reference characters refer to similar parts, and the numeral 20 designates a cabinet comprising a body portion 22 and a top portion 24 hinged thereto at 26.

Body portion 22 has a head-end wall 28, a foot-end wall 30, a front wall 32, and rear wall 34. These four vertical walls are rigidly secured together in rectangular form and suitably braced at their inner lower edge by an angle iron 36. Casters 38 provided respectively at the four corners above the floor, and to permit free movement of the cabinet about the room floor. The end and side walls are made sufficiently strong to support a bed with the weight of a patient thereon. Positioned adjacent the upper edge of the cabinet body 22 is a continuous rail 40, recessed adjacent the side and end walls to form a trough 42. This trough extends entirely around said cabinet and inclines slightly downwardly from the foot of the cabinet to the head of the cabinet to form a drainage of the used water back to an outlet slot 44 formed in a transverse trough 46 which communicates with the side trough adjacent the front end of the cabinet and inclines downwardly towards slot 44, the trough is provided with suitable lining 48 to withstand the chemical action of the liquids that may be used as spray materials.

Positioned in the bottom portion of cabinet body 22 and resting on angle irons 36 is rectangular, open tank or catch basin 50 which extends from adjacent the center of the cabinet to the head-end wall 28. This tank has a bottom drain pipe 52 by means of which the water may be drained therefrom.

Supported in cabinet 22 above tank 50 is a tank 54 disposed in spaced relation to head-end wall 28. The bottom 56 of tank 54 is downwardly inclined toward its centered portion which is provided with a strainer 58 communicating with the inlet port of a rotary pump 60 through a conduit 62. Pump 60 is mounted on a platform 64 securely carried by the cabinet body 22. An electric motor 66 mounted on platform 64 is connected for direct driving of pump 60 through a flexible connector 68. Mounted for rotation with the motor shaft is a fan 70 which moves the air to cool the motor. The outlet of pump 60 is connected to the water control valve 72 through conduit 74.

Control valve 72 is best shown in Figs. 6 and 7, and comprises a body member 76 having a central bore 78, in which is reciprocally mounted a pair of spaced apart valve pistons 80 and 82 which are joined together by a reduced axial stem 84. Two spaced apart ring groove ports 86 and 88 are controlled respectively by valve pistons 80 and 82. Groove port 86 communicates with an inlet cold water port 90, which interconnects with a cold water supply (such as a house service line) through a hose 92. Groove port 88 communicates with hot water conduit 74 through valve port 94. Formed in valve body 76 is an outlet port 96 disposed upwardly between the two ring groove ports, whereby the valves may be operated to deliver either hot or cold water to said outlet port which is interconnected to the spray nozzle through the flexible tube 98.

The valve body member 76 is secured by screws 100 to a shelf 102 which in turn is secured to the back wall 34. Piston valves 80 and 82 are reciprocated to control the flow of water to the spray nozzles by means of a solenoid 104 fixed to shelf 102. As shown in Fig. 6 a lever arm 106 pivoted at 108 to a bracket 110 integral with shelf 102. The stem 112 of a solenoid 104 is pivoted at 114 intermediate the ends of arm 106 and the piston 80 has an axially disposed stem 116 which is pivoted at 118 to arm 106 intermediate pivots 108 and 114 whereby when the solenoid is energized the valve will be moved to close port 94 and open inlet port 90 so that cold water will be delivered to outlet port 96. A rod 120 also pivotally mounted at 118 to arm 106 extends outwardly through the vertical wall 122 of shelf 102 for sliding movement thereto. A tension spring 124 positioned on rod 120 is disposed under tension against an abutment 126 fixed to rod 120 so that when solenoid 104 is energized spring 124 will be compressed and when the solenoid is de-energized the spring 124 will exert sufficient force to urge arm 106 to its original position with port 86 closed and port 88 open so that a flow of hot water will be delivered to the spray nozzles.

The solenoid 104 also functions to operate a tilting valve 128 which is pivotally carried by brackets 130 secured to the forward end of tank 54 and adapted to be tilted to direct drain water from slot 44 to the tank 50 when the solenoid 104 is energized and to the tank 54 when the solenoid is de-energized. This valve movement is effected through rod 132 which is pivoted at its one end at 134 to the upper end portion of arm 106 and at its other end to the radial disposed arm secured to the axis 136 of valve 128. When the solenoid is de-energized and the valves are set to deliver hot water to the spray nozzles then the valve 128 will be set to deliver water to tank 54 for recirculation to the spray nozzle.

It will be noted that the warm water will be conserved and recirculated as long as it is deemed desirable, thereby making it possible to medicate the water without too great a cost, and to reduce the heating cost. The water in tank 54 may be uniformly heated by means of a suitably controlled electric heater 140 submerged in the water 142 in tank 54. As the hot water is used in the spraying operation its temperature will be lowered and can be raised to the desired temperature by the thermostatically controlled heater 140, and then recirculated.

A platform or tray 144 rests on rail 40 and inclines downwardly toward the head of the cabinet. The top surface of the platform is slightly convex in cross section and its edges are so positioned that they will drain the water directly into trough 42. The body of platform 144 is preferably made of an electrical insulating material, and is covered by a sheet or pad of water protecting material 146. This platform is of sufficient size to support the body of the patient as his head is extended through the opening bight 148 formed in the forward end portion 150 of the top 24 to rest on the head rest 152 carried by bracket 154 securely mounted on body portion 22. This head rest is provided with a suitable cushion 156 which is inclined rearwardly and downwardly to drain water into trough 42.

The lower portion 158 of top portion 24 is of rectangular form and comprises front wall 160, head end wall 150, rear wall 162, and foot wall 164 which are normally disposed vertically from body portion 22.

The front wall is provided adjacent its head portion with an elongated aperture 166 provided with closure 168 hinged at 170 to hinge downwardly, and having a snap latch 172. Through this opening the operator will have access to the patient during the treatment period.

The upper portion of cabinet portion 24 comprises front end wall 174, foot end wall 176, front wall 178, and rear wall 180. The front and rear walls and head and foot walls are relatively upwardly and inwardly converging to present a narrow horizontally disposed top member 182.

Head end wall 174 is provided with an opening 184 through which a towel or sheet may be inserted and positioned about the patient's neck, to close the bight 148 to preclude the spraying of water from the cabinet. A door 186 hinged at 188 serves to close opening 184. This door is opened to position the towel, and may be closed on the upper end of the towel to secure it in place.

Top member 182 is provided with an elongated longitudinal opening 190 which extends substantially the length of the top member. Mounted on and secured along the marginal edges of top 182 adjacent slot 190 is an offset bar 192, whereby to form a slot 194 along each side of opening 190 to receive a rectangular slidable plate 196. Attached to the forward end of plate 196 is a pliable curtain member 198 having its edge portions disposed in slots 194 and attached at its outer end to spring actuated curtain roller 200 mounted in brackets 202 secured to head wall 174 to normally hold the curtain taut. The other end of plate 196 is likewise provided with a curtain 204 carried for extension on a spring actuated curtain roller 206 carried by foot wall 176 so that as plate 196 is moved rearwardly curtain 198 will pay out and curtain 204 will be taken up, then together with plate 196 will always close opening 190 regardless of the position of the plate in the opening.

Plate 196 is provided with an annular opening 210 in which is operatively fitted a ring member 212. This ring is provided with three pairs of vertically spaced-apart, radially disposed pins 214 which are adapted to engage the upper and lower surfaces of plate 196 at the marginal edge of opening 210. This mounting of the rings permits adjustable rotation thereof in the plate to allow for desirable positioning of the water spray nozzles as hereinafter described.

A disc 216 is mounted in ring 212 on a pair of diametrically opposed trunnions 218, which are pivotally mounted in the wall openings 220 of ring 212 to normally secure the disc in parallel relation with plate 196. The disc is normally held against accidental tilting movement on its trunnions by a pair of spring actuated brakes 222 and 224 disposed respectively on opposite sides of one of the trunnions 218, see Fig. 9.

Each brake comprising housing 226 integral with disc 216 is provided with a radially disposed recess 228 in which is slidably mounted a plug 230 which is urged outwardly to contact the inner wall of ring 213 by the action of spring 232 positioned under compression in recess 228 to rest against plug 230. Since the ring 212 oscillates through relatively short arcs, the plugs being positioned adjacent trunnion 218 will always remain in contact with ring 212 to prevent free swinging of disc 216.

The multiple nozzle member 274 is secured to a shaft 242 which is rotatably mounted in a bearing block 236 secured to disc 216 and in a sleeve 238 positioned in valve body 240 which is also secured to disc 216. A sleeve 244 fitted on the outer end of shaft 242 is anchored thereto by means of a diametrically disposed pin 246 which extends therethrough and beyond the outer surfaces thereof. Sleeve 244 is adapted to serve as a collar to prevent longitudinal movement in one direction and to serve as a barrel to receive a helical coil spring 248 thereabout. One end of spring 248 is anchored by post 250 to disc 216 and the other end 253 thereof is anchored to pin 246. Spring 248 is so wound and mounted as to constantly urge shaft 242 to rotate in a clockwise direction, when viewed from its outer end.

Valve body 240 is recessed at 254 and is provided with a valve seat 256 having a port 258 adapted to be regulated by a valve 260 carried on screw threaded stem 262 which extends through the valve body and is provided with an operating arm 264. The inlet port 266 of valve 240 communicates with tube 74 from pump 60 whereby water under pressure is fed to the valve. The water passing through port 258 then passes into a recess 268 formed axially in the inner end portion of shaft 242, then transversely through hole 270 into the bore 272 of nozzle 274 or any other nozzle that may be positioned with its bore in register with hole 270.

For the proper distribution of the water spray delivered from nozzle 274 to the patient the nozzle is oscillated through a predetermined angle whereby the stream of water may be successively passed up and down the patient's body at regular intervals by means of the following mechanism including a pump 276 having body member 278 of substantially cylindrical form provided with bored cylindrical recess 280 closed at its outer end by wall 282 and open at its inner end to receive the working parts. Mounted in recess 280 is a piston rod 284 carrying a piston head 286 of the cup washer type. The outer end portion of piston rod 284 is squared at 288 to pass through the square opening 290 formed axially through the end bearing washer 292 positioned in the open end of cylinder 276. This washer is provided with an annular groove 294 in which project the end portions of screws 296 whereby the washer is permitted to be rotated in cylinder 280. A plug 298 mounted in housing 300 is urged radially to engage in notches 302 formed in washer 292 at the base of groove 294. This spring actuated plug serves to prevent accidental rotation of washer 292 but permits of adjustment of the washer by manual force applied to the squared portion of piston rod 284. Adjustably mounted on the inner end portion of piston rod 284 is a pair of diagonally disposed discs 304 and 306 disposed in opposed relation and adapted to substantially fit the inner wall of the cylindrical recess 280 with their adjacent converging edges spaced apart and with their diametrically opposed edges converging at like angles from the plane perpendicular to the piston rod. These discs are adapted to strike a lug 322 to cause the moving of valve 330 from valve seat 332 when the piston is moved by the water under pressure delivered by pump 60 through flexible tube 98 to tube 310 thence to passageway 312 past needle valve 352 to opening 361 thence into cylinder 280 where it exerts pressure against piston 286 to drive the piston outwardly against the roller 316 rotatably mounted on shaft 315 carried by lever arm 318 which is rigidly mounted on shaft 242 whereby the spring 248 is wound sufficiently to drive the piston 286 to discharge water from the cylinder through drain 320 to discharge into the cabinet. When the discs 304 and 306 are in the position shown in Fig. 12 the length of stroke of the nozzle 274 will be at its maximum. To limit the length of stroke of 274 the piston rod 284 is rotated in either direction so that the valve pin 322 carried by sleeve 324 projecting into the cylinder 280 will be moved a less distance, thus shortening the stroke of the nozzle 274. The shortest distance of travel is produced when the adjacent portions of the discs 304 and 306 are in operative relation relative to the pin 322. This valve pin is carried by a sleeve 324 mounted for reciprocating movement in a valve cylinder 326 formed in the side wall of the pump body member 278. Sleeve 324 is slidably mounted on the stem 328 of valve 330 which cooperates with valve seat 332 to close the outlet from cylinder 280. A valve 334 cooperates with valve seat 336 to regulate the flow of water to drain pipe 320. Valve 334 is carried by valve stem 338 which is adjustable by thumb head 341 to regulate the valve relative to its seat. Valve stem 328 extends inwardly beyond the end of sleeve 324 and is provided at its outer end with a nut 340. A compression coil spring 342 positioned on valve stem 328 between sleeve 324 and nut 340 serves to facilitate a rapid movement of valve 330 from its seat when disc 306 strikes valve pin 322 and forces sleeve 324 inwardly against coil spring 342 whereby when it tensioned sufficiently to overcome the pressure tending to close valve 330 then the valve will quickly snap from its seat 332 to permit the flow of fluid through opening 344 past valve 330 to drain opening 320. The position of valve 334 will determine the speed of release of the fluid and time required for spring 248 to return the piston 286 to its retracted position. It will be noted that valve stem 328 is slotted transversely at 344 to permit limited longitudinal movement of pin 322. Should the pin 322 fail to release valve 330 before it strikes the wall of slot 344 it will force the valve from its seat and the compressed spring 342 will cause the valve 330 to move rapidly from its seat. Vent 346 in stem 328 and vent 348 in 278 serve to relieve the pressure in chamber 350 due to the action of spring 342.

As soon as valve 330 is opened water flows out drain 320 and the spring 248 will drive piston 286 to its retracted position, during said retracting disc 304 will carry pin 322 backward to seat valve 330 and to close the exhaust 320. When this has been accomplished the incoming water under pressure will act against piston 286 to gradually oscillate lever 318 whereby the nozzle will be oscillated. The speed of travel of said piston on its outward stroke is determined by the positioning of valve 352 relative to valve seat 354. The position of this valve is controlled by lever arm 356 which is securely fixed to valve stem 358. By moving valve 352 toward valve seat 354 the time period for moving the piston against roller 316 is lengthened. Water is fed into chamber 280 through port 361 formed in 278. The numeral 360 designates a guide disc fixed concentrically on piston rod 264 which serves to stabilize the motor plunge in its operation. Plug 362 closes chamber 350 and plug 364 serves to close an aperture formed in 278 to facilitate the positioning and the removal of pin 322.

Figures 19, 20, 21, 22, 23, 24, 25 and 26 are modified forms of the parts shown in Figures 9, 10, 11, 12, 13 and 14. These modified structures show parts which function to perform the same general work as the corresponding parts in the preferred forms.

Figure 11:
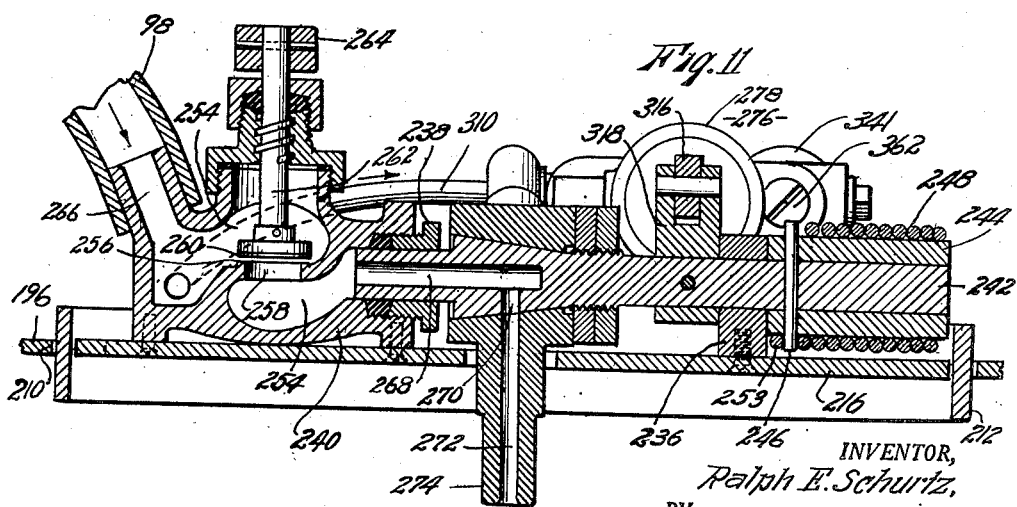
Fig. 11 is a sectional view taken on line XI—XI of Fig. 9.

Referring now to Fig. 19 which corresponds to Fig. 11 it will be noted that shaft 366 extends through packing nut 338 and into valve body 240. This shaft is integral with a nozzle body 368 and is hollow at 370 to communicate with the nozzle recess 372. Disposed in an axial alignment with shaft 366 and integral with the opposite side of nozzle body 268 is stem 374 bored axially at 376 and provided with suitable threads 378 to receive a tapered screw 380. This stem is slit inwardly at 379 from its outer end to a point beyond the threaded portion, whereby when the tapered screw 380 is screwed to position as shown, it will spread the two legs of the slit stem 374 apart and against the inner wall of elongated tube 382 to secure the stem and tube together. The degree of tension between the stem and tube can be regulated by screwing the screw 380 to different depths into the stem 374. Tube 382 extends from nozzle 368 to a point beyond stem 374 and is mounted for rotation in a bearing block 384 rigidly secured to disc 216 by screw 386. The outer end portion of tube 382 is fitted with a sleeve 388 which is secured thereto by means of a set screw 390 which also serves to anchor one end of the helical spring 248 to said tube 382 while the other end of said spring is secured to disc 216 by screw 394. The lever arm 318 is secured about tube 382 by set screw 392.

Referring to nozzle body 368 it will be noted that it has a reduced, externally threaded portion 396 adapted to receive an internally threaded nozzle valve seat 398 adapted to be threaded thereon. The valve stem 400 extends through the upper end wall 402 of nozzle 368 and through a packing gland 404 and has an enlarged, hollow central portion 406 having an externally threaded portion 408 adapted to operatively engage in internal threads 410 formed in the inner wall of nozzle 368. The lower end portion of stem 400 is provided with a hemispherical valve 412 which cooperates with valve seat 398 to vary the type of steam delivered. Valve stem head 414 to facilitate assembly of the parts is removably attached to stem 400. It will be noted that the lower tip portion 416 of nozzle 368 is removably secured to the body portion 368 and carries the valve seat 398. By replacing the tip with different valve seats the type of steam can be quickly varied.

Referring now to Figures 23, 24, 25 and 26 which show a modified form of the water pressure motor which is provided with a pair of spaced apart, oppositely wound helical operating members 418, and 420 fixed to the inner cylindrical end portion 284 of square piston rod 288. Also fixed to the end portion 284 is a guide disc 422 which serves to stabilize the free end of piston rod 288.

The squared outer portion of the valve stem 288 extends through a square hole 424 formed through adjustable end disc 426. This disc is normally secured in position by the lugs 428 which are forced tightly against the periphery of disc 426 by means of screws 430. A handle 432 fixed to the outer face of disc 426 serves as a hand grip to move the helical operating members to the desired position to properly operate the valve 434. Fixed concentrically on piston rod 288 is a piston 436 which is adapted to be moved by liquid under pressure in like manner as in the preferred form.

Referring now to the passage of pressure liquid to and from the cylinder chamber 280, it will be noted that the inlet pipe 310 is provided with a normally adjustable needle valve 438, which regulates the flow of pressure fluid through part 440 to chamber 280. The outlet valve 434 comprises a movable valve housing 442 mounted in a recess 444 formed in the central lower portion of cylinder 446 and extending into cylinder chamber 280 in the path of travel of operating members 418 and 420. When the piston 436 is moved forwardly by liquid pressure operating member 420 will contact the end of valve housing 442 to move it against the action of spring 448 which is positioned in the housing between the end of the housing and the ball valve 450. This valve 450 is urged to its seat 452 by the high pressure in chamber 280, however when spring 448 has been compressed sufficiently it will overcome this pressure urge and release said valve from its seat and snap it from the seat so that there will be no chattering of the valve in the opening operation. After the ball valve has been opened the liquid under pressure will be exhausted past adjustable valve 454 and out the drain opening 456. In the operation of the motor it is necessary to provide a longer opening at outlet valve 454 than is provided for the inlet of liquid through needle valve 438. When valve 450 is opened there will not be enough pressure against the piston 436 to drive it against the tension of spring 248 and the spring will reverse the direction of travel of piston in the cylinder 280 until the ball valve 450 is returned to its seat by the operating member 418 engaging the valve housing 442. Spring 448 is so tensioned that it will exert no pressure against the ball valve 450 when the parts are in the position shown in Figure 23. A bridge member 458 integral with valve housing 442 is positioned above ball valve 450 to prevent its accidental displacement from the housing. It will be apparent that should the power be shut off the machine while valve 450 is still seated the spring 248 will drive the piston against the fluid in cylinder 280 to drive it through valve 438 so that the piston will be removed to the starting point. When the piston is thus retracted the nozzle 416 will be directed to deliver a liquid stream toward the lower extremities of the patient. This is very important since the application of hot or cold water to the patient should always be started at the lower extremities and gradually moved upwardly to avoid any objectional nervous shock.

Figure 18:
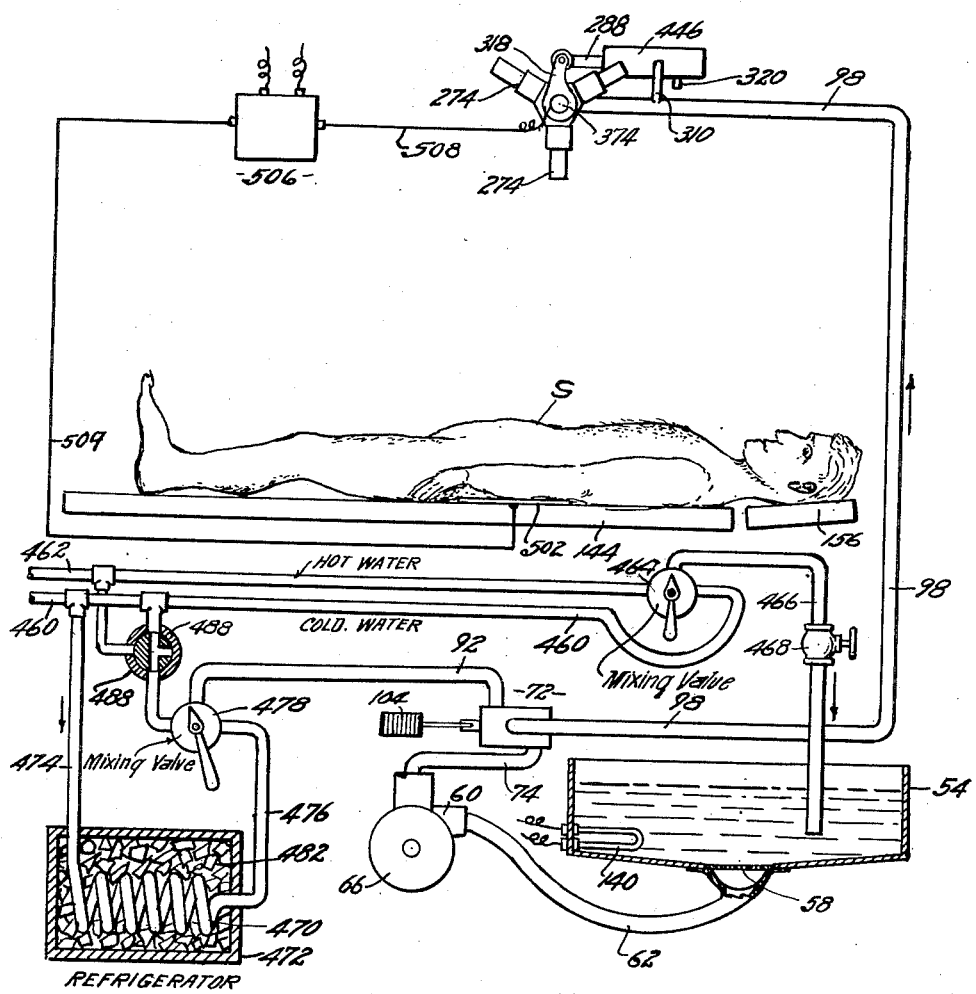
Fig. 18 is a diagrammatic view showing the circulatory fluid and electrical system of the apparatus.

Referring to Fig. 18 which shows a diagrammatic view of the water and electric system it will be noted that the water service lines 460 and 462 are respective cold and hot water service lines, the cold water comes from the incoming outside line which is usually of a temperature from 36 to 60 degrees. Water from line 462 is normally fed to mixer valve 464 thence to pipe 466 through open valve 468 and into tank 54. When the water in line 462 is too hot then water is tempered by means intermixing it with the proper amount of cold water fed through line 460 into mixing valve 464 where the desired temperature may be obtained. The water delivered to tank 54 may be maintained at predetermined temperature by thermostatically controlled electric heater 140 as it is successively passed through tube 62, pump 60, tube 74, water control valve 72 to conductor 98, then to nozzle 274 where it is discharged on the patient.

A refrigerator coil 470 mounted in box 472 is connected at its one end by pipe 474 to cold water pipe 460 and at its other end by pipe 476 to mixing valve 478. Refrigerator coil 470 may be surrounded by any suitable refrigerant 482 such as ice.

Water delivered through pipe 476 enters the mixing valve 478 which may be of the well known thermostatically controlled type. For cold application of water the water passes through the mixer and is mixed with the cold water from pipe 460 which in the summer time is tempered by the summer heat, it then passes through three-way valve 488 to mixing valve 478 to control valve 72, pipe 98 to nozzle 274 from which it is discharged to the patient.

During the winter time when water in pipe 460 is too cold for body application the operator moves valve 488 to direct warm water from pipe 462 directly to mixing valve 478 where water from pipe 460 passing through pipe 474, unrefrigerated coil 470, pipe 476 to mixing valve 478 where it is tempered with the hot water from pipe 462, and delivered through pipe 92, control valve 72, pipe 98 to nozzle 274 from which it is sprayed to the body S of the patient.

Figure 27:
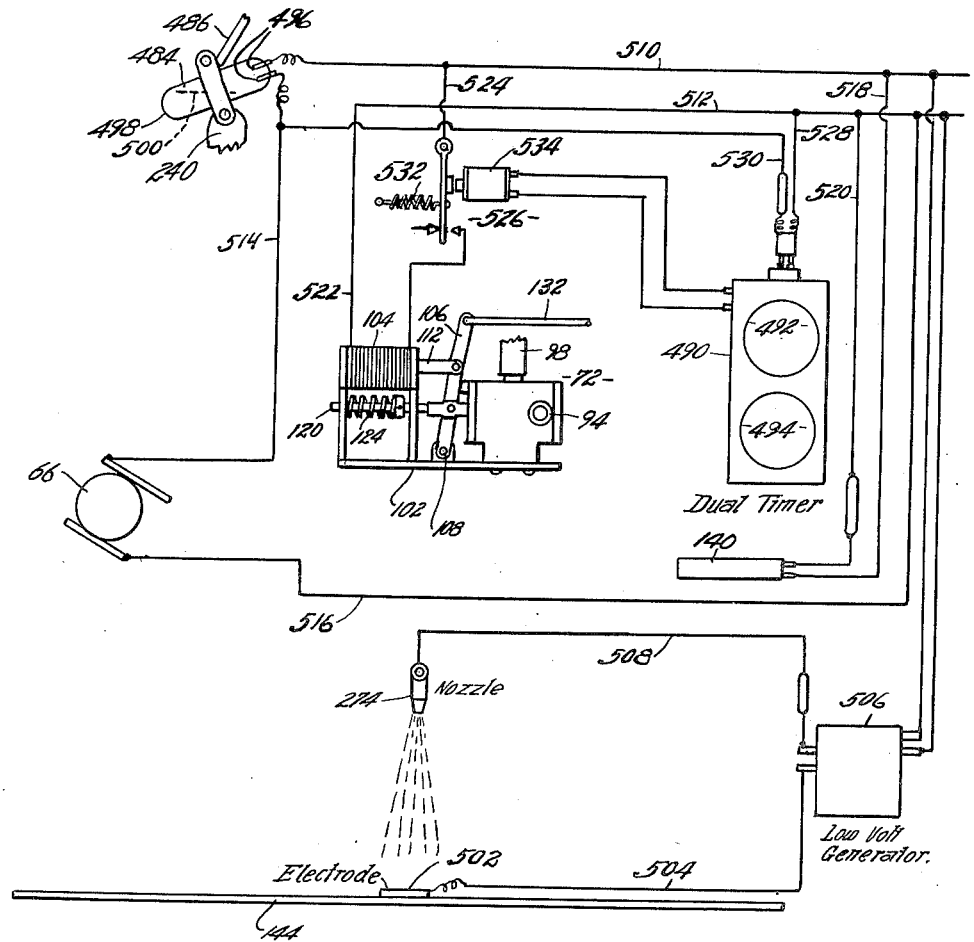
Fig. 27 is a diagrammatical view of the electric circuit controlling the parts in this apparatus.

Referring now to Fig. 27 which discloses the electric circuit in diagrammatic form it will be noted that certain of the controlling units such as the dual time, low volt generator which are well known in the industry are not shown in their entirety but are simply indicated. The dual timer indicated as numeral 490 provides two chronometers 492 and 494, one to regulate the duration of the application of hot water and one to regulate time of application of cold water. Usually the two applications are alternately applied in materially different time periods, however it is not intended to follow any fixed pattern of water applications since they may be materially changed by separately setting the chronometers to operate in alternate relation.

The electrical circuit shown in Fig. 27 shows the tilting electric switch 484 mounted on valve body 240 and operable by pin 486 carried by operating arm 264 of valve 256 which controls the starting and stopping of motor 66. The contacts 496 mounted in mercury tube 498 are shown in the open position when the valve arm operating pin 486 is in position as shown to hold the mercury 500 in the down position. As soon as the operator moves arm 264 to open valve 260 the contacts 496 are closed by the mercury 500, since the mercury tube is so balanced that it will normally move to the closed position and can only be opened as long as the pin 286 forces it out of balance. The flow of water through valve port 258 can be regulated after the circuit has been closed to motor 66 to drive rotary pump 60.

As a further object of this ivention it will be noted that switch 484 is mounted on lid 24 hinged at 26 so that when said lid is moved to the open position as shown in dotted lines in Fig. 8 the mercury valve will always be open regardless of the position of valve arm 264, thus insuring the shutting off of motor 66 whenever the cabinet is open.

The patient S rests on electrode 502 which is connected by wire 504 to the low voltage generator 506. The other side of the generator is connected to the spray nozzle by means of wire 508. When the spray is on and the generator 506 is operating an electric charge will be delivered to the patient's body.

In Fig. 27 live wires 510 and 512 serve to deliver a suitable electric current to the system. Wire 510 connects to one of the contacts 496 and the other contact is connected by wire 514 to one side of motor 66 while the other side of the motor is connected by wire 516 to live wire 512. Heater 140 is connected by wires 518 and 520 to live wires 510 and 512 respectively. Solenoid 104 is connected by wire 522 to live wire 510 and by wire 524 through the dual timer mechanism 490 and 526 to the other side of said solenoid. This dual timer is provided with electric power through wires 528 and 530 which connect with wires 510 and 514 respectively. The dual timer mechanism 526 is operated in one direction by spring 536 and in the other direction by the electric coil 534 connected by wires 536 and 538 to timer 492.

These electric and mechanical parts serve to control the periods of application of hot and cold water to the patient.

I claim:

1. In a therapeutic bath apparatus, a mounting plate, a nozzle carried by said plate for oscillatory pivotal movement, means for supplying liquid under pressure to said nozzle, a hydraulic cylinder mounted on said plate, a piston and piston rod mounted operably in said cylinder, an operative connection between said piston rod and said nozzle whereby said piston is adapted by its forward movement to pivot said nozzle in one direction, resilient means urging said nozzle and piston in the opposite direction, said cylinder having inlet and exhaust ports behind said piston, means for supplying fluid under pressure to said inlet port, a valve controlling the flow of fluid through said outlet port, said valve including a movable operating member projecting adjacent said piston rod and operable by forward and rearward movement to open and close said valve respectively, and a pair of trip members mounted fixedly on said piston rod respectively forwardly and rearwardly of said valve operating member and adapted to contact and move said valve operating member alternately at the forward and rearward limits of movement of said piston.

2. In a therapeutic bath apparatus, a mounting plate, a nozzle carried by said plate for oscillatory pivotal movement, a conduit for supplying liquid under pressure to said nozzle, a hydraulic cylinder mounted on said plate, a piston and piston rod mounted operably in said cylinder, an operative connection between said piston rod and said nozzle whereby said piston is adapted by its forward movement to pivot said nozzle in one direction, resilient means urging said nozzle and piston in the opposite direction, said cylinder having inlet and exhaust ports behind said piston, a by-pass conduit interconnecting said nozzle conduit and said inlet port for supplying fluid under pressure to said cylinder, a valve controlling the flow of fluid through said outlet port, said valve including a movable operating member projecting adjacent said piston rod and operable by forward and rearward movement to open and close said valve respectively, and a pair of trip members mounted fixedly on said piston rod respectively forwardly and rearwardly of said valve operating member and adapted to contact and move said valve operating member alternately at the forward and rearward limits of movement of said piston.

3. In a therapeutic bath apparatus, a mounting plate, a nozzle carried by said plate for oscillatory pivotal movement, a conduit for supplying liquid under pressure to said nozzle, a hydraulic cylinder mounted on said plate, a piston and piston rod mounted operably in said cylinder, an operative connection between said piston rod and said nozzle whereby said piston is adapted by its forward movement to pivot said nozzle in one direction, resilient means urging said nozzle and piston in the opposite direction, said cylinder having inlet and exhaust ports behind said piston, a by-pass conduit interconnecting said nozzle conduit and said inlet port for supplying fluid under pressure to said cylinder, a valve controlling the flow of fluid through said outlet port, said valve including a movable operating member projecting adjacent said piston rod and operable by forward and rearward movement to open and close said valve respectively, a pair of trip members mounted fixedly on said piston rod respectively forwardly and rearwardly of said valve operating member and adapted to contact and move said valve operating member alternately at the forward and rearward limits of movement of said piston, and a manually adjustable flow regulating valve disposed in said by-pass conduit, whereby the duration of the forward stroke of the piston may be regulated.

4. In a therapeutic bath apparatus, a mounting plate, a nozzle carried by said plate for oscillatory pivotal movement, a conduit for supplying liquid under pressure to said nozzle, a hydraulic cylinder mounted on said plate, a piston and piston rod mounted operably in said cylinder, an operative connection between said piston rod and said nozzle whereby said piston is adapted by its forward movement to pivot said nozzle in one direction, resilient means urging said nozzle and piston in the opposite direction, said cylinder having inlet and exhaust ports behind said piston, a by-pass conduit interconnecting said nozzle conduit and said inlet port for supplying fluid under pressure to said cylinder, a valve controlling the flow of fluid through said outlet port, said valve including a movable operating member projecting adjacent said piston rod and operable by forward and rearward movement to open and close said valve respectively, and a pair of trip members mounted fixedly on said piston rod respectively forwardly and rearwardly of said valve operating member and adapted to contact and move said valve operating member alternately at the forward and rearward limits of movement of said piston, and a manually adjustable flow regulating valve interconnected with said exhaust port, whereby the duration of the rearward stroke of the piston may be regulated.

5. In a therapeutic bath apparatus, a mounting plate, a nozzle carried by said plate for oscillatory pivotal movement, a conduit for supplying liquid under pressure to said nozzle, a hydraulic cylinder mounted on said plate, a piston and piston rod mounted operable in said cylinder, an operative connection between said piston rod and said nozzle whereby said piston is adapted by its forward movement to pivot said nozzle in one direction, resilient means urging said nozzle and piston in the opposite direction, said cylinder having inlet and exhaust ports behind said piston, a by-pass conduit interconnecting said nozzle conduit and said inlet port for supplying fluid under pressure to said cylinder, a valve controlling the flow of fluid through said outlet port, said valve including a movable operating member projecting adjacent said piston rod and operable by forward and rearward movement to open and close said valve respectively, a pair of trip members mounted fixedly on said piston rod respectively forwardly and rearwardly of said valve operating member and adapted to contact and move said valve operating member alternately at the forward and rearward limits of movement of said piston, and a pair of adjustable flow regulating valves disposed respectively in said by-pass conduit and in connection with said exhaust port, whereby the duration of the forward and rearward strokes of the piston, respectively, may be regulated independently.

6. In a therapeutic bath apparatus, a mounting plate, a nozzle carried by said plate for oscillatory pivotal movement, a conduit for supplying liquid under pressure to said nozzle, a hydraulic cylinder mounted on said plate, a piston and piston rod mounted operably in said cylinder, an operative connection between said piston rod and said nozzle whereby said piston is adapted by its forward movement to pivot said nozzle in one direction, resilient means urging said nozzle and piston in the opposite direction, said cylinder having inlet and exhaust ports behind said piston, a by-pass conduit interconnecting said nozzle conduit and said inlet port for supplying fluid under pressure to said cylinder, a valve controlling the flow of fluid through said outlet port, said valve including a movable operating member projecting adjacent said piston rod and operable by forward and rearward movement to open and close said valve respectively, a pair of trip members mounted fixedly on said piston rod respectively forwardly and rearwardly of said valve operating member and adapted to contact and move said valve operating member alternately at the forward and rearward limits of movement of said piston, and means operable to adjust the distance between said trip members in a direction parallel to said piston rod, at their points of engagement with said valve operating member, whereby to adjust the length of stroke of said piston.

7. In a therapeutic bath apparatus, a mounting plate, a nozzle carried by said plate for oscillatory pivotal movement, a conduit for supplying liquid under pressure to said nozzle, a hydraulic cylinder mounted on said plate, a piston and piston rod mounted operably in said cylinder, said piston rod being manually rotatable about its longitudinal axis, means carried by said cylinder and operable to secure said piston rod adjustably at any point of its rotation, an operative connection between said piston rod and said nozzle whereby said piston is adapted by its forward movement to pivot said nozzle in one direction, resilient means urging said nozzle and piston in the opposite direction, said cylinder having inlet and exhaust ports behind said piston, a by-pass conduit interconnecting said nozzle conduit and said inlet port for supplying fluid under pressure to said cylinder, a valve controlling the flow of fluid through said exhaust port, said valve including a movable operating member projecting adjacent said piston rod and operable by forward and rearward movement to open and close said valve respectively, and a pair of disc-like trip members secured concentrically to said piston rod respectively forwardly and rearwardly of said valve operating member and adapted to contact and move said valve operating member alternately at the forward and rearward limits of movement of said piston, said trip members being planar and inclined oppositely relative to the axis of the piston rod whereby the distance therebetween in a direction parallel to the piston rod varies at different points in the circumference thereof, said piston rod being adapted by its rotation to bring any desired portions of said trip members into operative relationship with the valve operating member.

References Cited in the file of this patent

UNITED STATES PATENTS

| Number | Name | Date |
|---|---|---|
| 1,751,640 | Lindhorst | Mar. 25, 1930 |
| 2,087,175 | Voight | July 13, 1937 |
| 2,309,782 | Orr | Feb. 2, 1943 |
| 2,322,271 | Bagley | June 22, 1943 |
| 2,413,002 | Schurtz | Dec. 24, 1946 |
| 2,443,568 | Palm | June 15, 1948 |
| 2,453,844 | Hungate | Nov. 18, 1948 |
| 2,535,469 | Wanke | Dec. 26, 1950 |
| 2,540,159 | Antrim | Feb. 6, 1951 |
| 2,581,781 | Ahlfors | Jan. 8, 1952 |